(12) United States Patent
Allam et al.

(10) Patent No.: US 8,370,292 B2
(45) Date of Patent: Feb. 5, 2013

(54) IDENTIFYING AND DEFINING INFORMATION SERVICES FOR DELIVERY IN A SERVICE ORIENTED ARCHITECTURE

(75) Inventors: Abdul Allam, Research Triangle Park, NC (US); Asit Dan, Somers, NY (US); Claus T Jensen, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 12/916,949

(22) Filed: Nov. 1, 2010

(65) Prior Publication Data

US 2012/0109881 A1    May 3, 2012

(51) Int. Cl.
*G06F 7/00* (2006.01)
(52) U.S. Cl. ....................................................... 707/607
(58) Field of Classification Search .................... 707/607
See application file for complete search history.

(56) References Cited

U.S. PATENT DOCUMENTS

| | | | |
|---|---|---|---|
| 2005/0119905 A1 | 6/2005 | Wong et al. | |
| 2008/0028365 A1* | 1/2008 | Erl | 717/105 |
| 2009/0024372 A1 | 1/2009 | Chen et al. | |
| 2009/0132211 A1 | 5/2009 | Lane et al. | |
| 2009/0193432 A1* | 7/2009 | McKegney et al. | 719/315 |
| 2010/0138254 A1* | 6/2010 | Brown et al. | 705/7 |

* cited by examiner

Primary Examiner — Jensen Hu

(74) Attorney, Agent, or Firm — Steven M. Greenberg, Esq.; Carey, Rodriguez, Greenberg & O'Keefe

(57) ABSTRACT

A method for information service identification during service modeling of a service oriented architecture (SOA) architected computing system includes loading a business process defined by different business services in memory of a service modeling tool executing in a host computing platform. The method further includes identifying different information elements directed for access by the business services and determining a set of information transactions for the identified different information elements. The method yet further includes generalizing the set of information transactions into a candidate list of information services. The method even yet further includes selecting from amongst the candidate list a selection of information services for incorporation into the business process. Finally, the method includes refining the business services of the business process to invoke the selection of information services to access the identified different information elements.

17 Claims, 2 Drawing Sheets

IDENTIFYING AND DEFINING INFORMATION SERVICES FOR DELIVERY IN A SERVICE ORIENTED ARCHITECTURE

BACKGROUND OF THE INVENTION

1. Field of the Invention

The present invention relates to the field of service oriented architecture (SOA) based computing solutions and more particularly to data access functions in an SOA based computing solution.

2. Description of the Related Art

As businesses and consumers become further interconnected through computer communications networks such as the global Internet and local intranets, the Web sites and companion computing applications which integrate interactions between businesses and consumers alike are becoming ever more complex. Addressing the explosion of business to business and business to consumer interactions on-line, information technologists increasingly focus on architecting and implementing complete business site solutions to reflect the entire life cycle of a business in lieu of integrating multiple, disparate applications which when combined reflect the business life cycle. Consequently, as modern commerce sites can be both large and distributed, business systems have been configured to deploy complete business systems in as seamless a fashion as possible.

It is now a common trend that traditional, stand-alone, commerce oriented applications are produced from one or more components which can be individually re-used to create business processes for different solutions. Each of these components can expose itself as a set of reusable business functions, also referred to as "services" comporting with computing standards for deploying enterprise level logic that facilitate an open service oriented architecture (SOA). An SOA essentially can be defined as a system where all exposed business and technical functions are in the form of reusable services. These reusable services can communicate with each other to engage either in simple data passing between two or more services, or in activity coordination by two or more services.

In a SOA, a client can invoke an operation on a service to perform a function and, optionally the client can receive a response. Invoked services are generally business functions configured to fulfill the needs of business customers, whether those customers are individual consumers or other businesses. The functions can be grouped into various services where each service can specialize in functions such as catalog management, shopping cart management, credit card transaction processing, sales tax computation and the like. By utilizing an SOA, services in a commerce solution can interoperate with other business processes in a larger commerce solution involving one or more separate business entities and one or more separate consumer entities.

Existing SOA design methodology provides step-by-step guidance for decomposing high-level business goals and processes into meaningful business activities, and for identifying business services. The decomposition of business functions into corresponding business services also aids in the identification of reusability across multiple business processes and provide higher level functions, where each function is aligned with the business activity. By comparison, information access tasks performed by information services are lower level functions for data access. Hence, business logic generally is not tied to a specific data source for information consumed by the business logic. By externalizing the information access logic, the implementation of the information service providing access to information consumed by business logic can change freely without affecting the operation of the business logic. Many existing information access tasks performed by stored procedures or federated queries can be exposed as "technical services". As it is well-known in the art, technical services are the physical implementations that support various service patterns. These services implement both functional and non-functional requirements. As such, technical services include infrastructure services that help in operating the services and provide monitoring and management capabilities.

Many packaged applications and data management solutions provide out-of-the-box technical services. However, business services identified by the service oriented modeling and architecture methodology (SOMA) or other SOA design methodology, may or may not map directly one-to-one to a single information service that is pre-defined using a bottom up approach. Business service implementers or developers of other packaged solutions may exploit such pre-defined information services using an ad-hoc approach. However, in the absence of a well-defined SOA methodology that explicitly identifies required information services in meeting the data access needs of the business services using a step-by-step approach, most SOA based solutions and other applications frequently use ad hoc data access logic, such as hard-coded access to fixed data sources.

Existing service modeling defines only the external interface while the internal realization of the service focuses on aligning consuming outgoing interfaces with providing service endpoints. Recently, service modeling has been extended to include information consumed by such services as well as various non-functional requirements associated with information access. In the business entity life-cycle analysis (BELA) approach described by J. K. Strosinider et al. in the Association of Computing Machinery publication entitled MODEL-DRIVEN SYNTHESIS OF SOA SOLUTIONS, business activities and services are identified by first identifying business entities and the associated information model, and then identifying/analyzing changes to business entity by business activities. In both existing service modeling and the extended form embodied by the BELA approach, the information consumed by business services are identified as a by-product of modeling and identification of business services. However, neither approach includes identification of reusable technical services such as information services.

BRIEF SUMMARY OF THE INVENTION

Embodiments of the present invention address deficiencies of the art in respect to service modeling of information services, and provide a novel and non-obvious method, system and computer program product for information service identification during service modeling of an SOA architected computing system. In an embodiment of the invention, a method for information service identification during service modeling of a SOA architected computing system can be provided. The method includes loading a business process that consumes a set of well defined different business services in memory of a service modeling tool executing in a host computing platform. The method further includes identifying different information elements directed for access by the business services and determining a set of information transactions for the identified different information elements. The method yet further includes generalizing the set of information transactions into a candidate list of information services, namely collapsing one or more different information transactions into a larger information transaction. The method even yet further includes selecting from amongst the candidate list a selection of information services for incorporation into the business process. Finally, the method includes refining the business services of the business process to invoke the selection of information services to access the identified different information elements.

In an aspect of the embodiment, identifying different information elements directed for access by the business services can include identifying different information elements directed for access by the business services and corresponding access types selected from the group consisting of create, read, update and delete, otherwise known in the art as "CRUD". In another aspect of the embodiment, generalizing the set of information transactions into a candidate list of information services can include determining dependencies amongst the business services directing access to the information elements and generalizing the set of information transactions into a candidate list of information services while excluding from the list information transactions for information elements for which access thereto on behalf of one of the business services is dependent upon access thereto on behalf of another of the business services.

In yet another aspect of the embodiment, selecting from amongst the list of candidate information services a selection of information services for incorporation into the business process, can include selecting from amongst the list of candidate information services a selection of information services for incorporation into the business process according to selection criteria. For example, the selection criteria can include performance improvement criteria. As another example, the selection criteria can include data transfer reduction criteria. As even yet another example, the selection criteria comprises reusability criteria.

In another embodiment of the invention, a service modeling data processing system can be configured for information service identification during service modeling of a SOA architected computing system. The data processing system can include a host computing platform that includes at least one computer with at least one processor and memory. The system also can include an SOA modeling tool executing in memory in the host computing platform. The system yet further can include an information service selection module coupled to the SOA modeling tool. The module can include program code enabled to identify different information elements directed for access by different business services of a business process loaded in the SOA modeling tool, to determine a set of information transactions for the identified different information elements, to generalize the set of information transactions into a list of candidate information services, to select from amongst the list of candidate information services a selection of information services for incorporation into the business process according to selection criteria, and to refine the business services of the business process to invoke the selection of information services to access the identified different information elements.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for information service identification during service modeling of an SOA architected computing system. In accordance with an embodiment of the invention, information elements consumed by different business services of a business process defined in a business process model can be identified along with a type of transaction affecting the information elements—namely create, read, update and delete. Different information transactions requisite to enable each transaction type for a corresponding information element by a business service can be determined and generalized, when possible. Dependencies between different ones of the business services can be determined and a set of candidate information services each able to perform one or more of the transactions can be identified. Finally, individual ones of the candidate information services can be selected for mapping to the business services to afford access to the information elements requisite to the operation of the business services and incorporated into the business process model.

Figure 1:
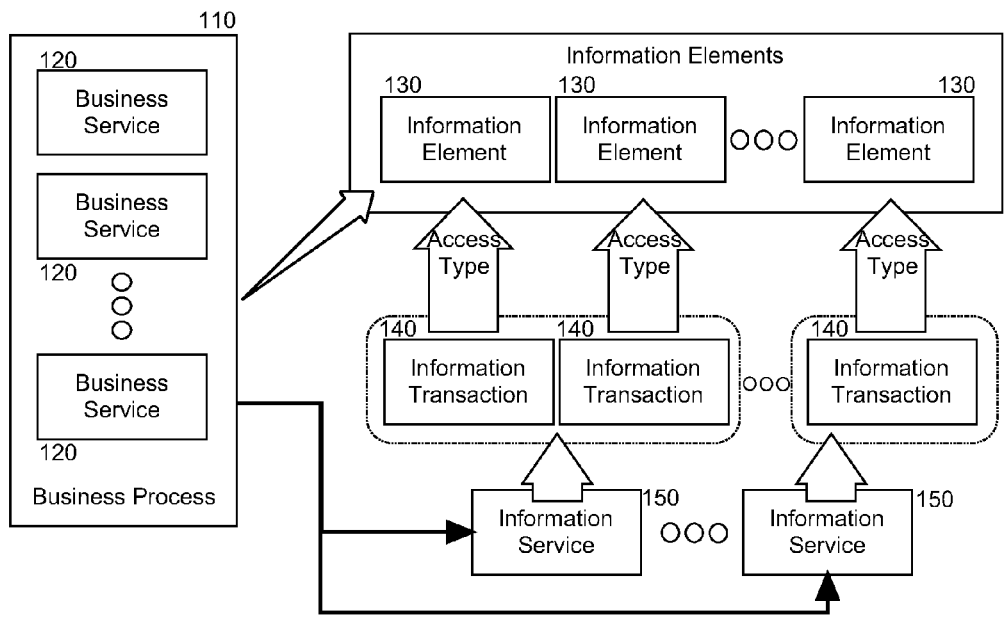
FIG. 1 is a pictorial illustration of a process using information services during service modeling of an SOA architected computing system.

In further illustration, FIG. 1 is a pictorial illustration of a process using information services during service modeling of an SOA architected computing system. As shown in FIG. 1, a business process 110 can be defined within a modeling tool (not shown) to include multiple different business services 120. Each of the business services 120 can act upon different information elements 130 (essentially data such as that stored in a database). The actions performed upon the information elements 130 can include by way of example, create, read, update and delete. The different actions performed upon the information elements 130 can be performed by granular information transactions 140 such as updateData( ) deleteData( ) addData( ) and so forth. An information service 145, in turn can provide an interface to one or more of the granular information transactions 140.

In a process of the invention, those of the information elements 130 consumed by the business services 120 can be identified and the different information transactions 140 requisite to accessing the information elements 130 according to a directed access type additionally can be identified. Dependencies resulting from one of the business services 120 acting upon a corresponding one of the information elements 130 temporally prior to a different one of the business services 120 acting upon the same corresponding one of the information elements 130 can be further identified. Thereafter, one or more different information transactions 140 for business services 120 not dependent upon others of the business services can be generalized to an information service 150 to form a candidate list of information services 150—for example by collapsing one or more different information transactions 140 into a larger information transaction.

Alternatively the business services can be generalized to an information service 150 by extending one or more of the information transactions that returns primary business information to return additional business information related to the primary business information, resulting in the potential reuse of each generalized information service 150 across multiple business processes 110. By way of example, an information transaction retrieving only a customer address can be generalized to return additional related customer information such as a phone number. Thus the generalized information service that retrieves various customer information can be used by different business processes each consuming only a subset of this information such as the customer address or the customer phone number.

In either case, finally selected ones of the information services 150 in the candidate list can be incorporated into the business process 110 according to selection criteria such as performance improvement criteria, data transfer reduction criteria, or reusability criteria.

Figure 2:
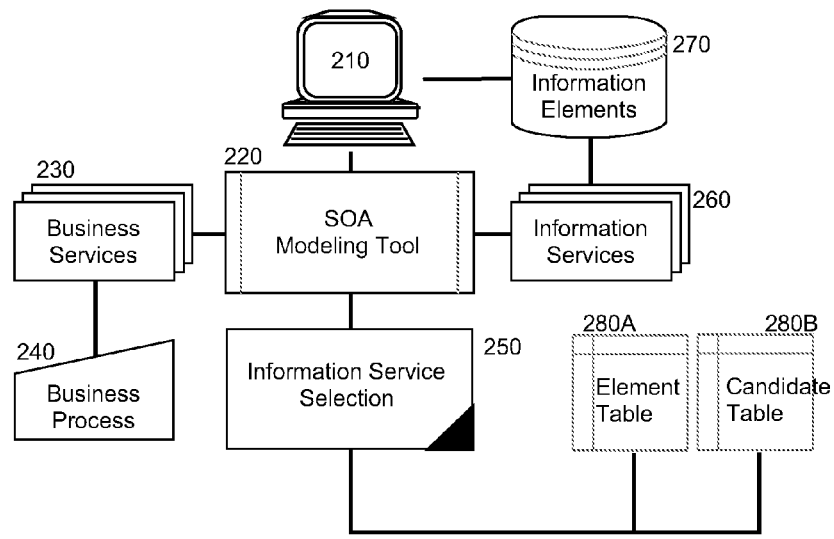
FIG. 2 is a schematic illustration of a service modeling data processing system configured for information service identification during service modeling of an SOA architected computing system; and, FIG. 3 is a flow chart illustrating a process for information service identification during service modeling of an SOA architected computing system.

The process described in connection with FIG. 1 can be implemented in a service modeling data processing system. In further illustration, FIG. 2 schematically depicts a service modeling data processing system configured for information service identification during service modeling of an SOA architected computing system. The system can include a host computing platform 210 that can include one or more computers, each with at least one processor and memory. The host computing platform 210 can support the execution of an SOA modeling tool 220 in which a business process 240 can be defined to include multiple different business services 230. The business services 230 in turn can include individual directives to access information elements 270 according to access type such as create, read, update and delete.

Of note, information service selection module 250 can be coupled to SOA modeling tool 220 and can execute in memory of the host computing platform 210. The information service selection module 250 can include program code to identify those of the information elements 270 directed for access by the business services 230. The program code further can be enabled to identify corresponding granular information transactions programmed to facilitate the directed access and to manage an element table 280A that includes records for each of the information elements 270 consumed by the business services 230. The records of the element table 280A further can indicate for each of the information elements 270 which of the business services 230 direct corresponding consumption and an access type directing the consumption, and whether or not the consumption of individual ones of the information elements 270 depends upon a prior consumption by a different one of the business services 230.

The program code of the information service selection module 250 yet further can be enabled to generalize the granular information transactions into respective information services 260. Even yet further, the program code of the information service selection module 250 can be enabled to manage a candidate table 280B of selected ones of the information services 260 devoid of intra-business service dependencies. Finally, the program code of the information service selection module 250 can be enabled to select from amongst the candidate table 280B particular ones of the information services 260 according to selection criteria such as performance improvement criteria, data transfer reduction criteria, or reusability criteria.

Figure 3:
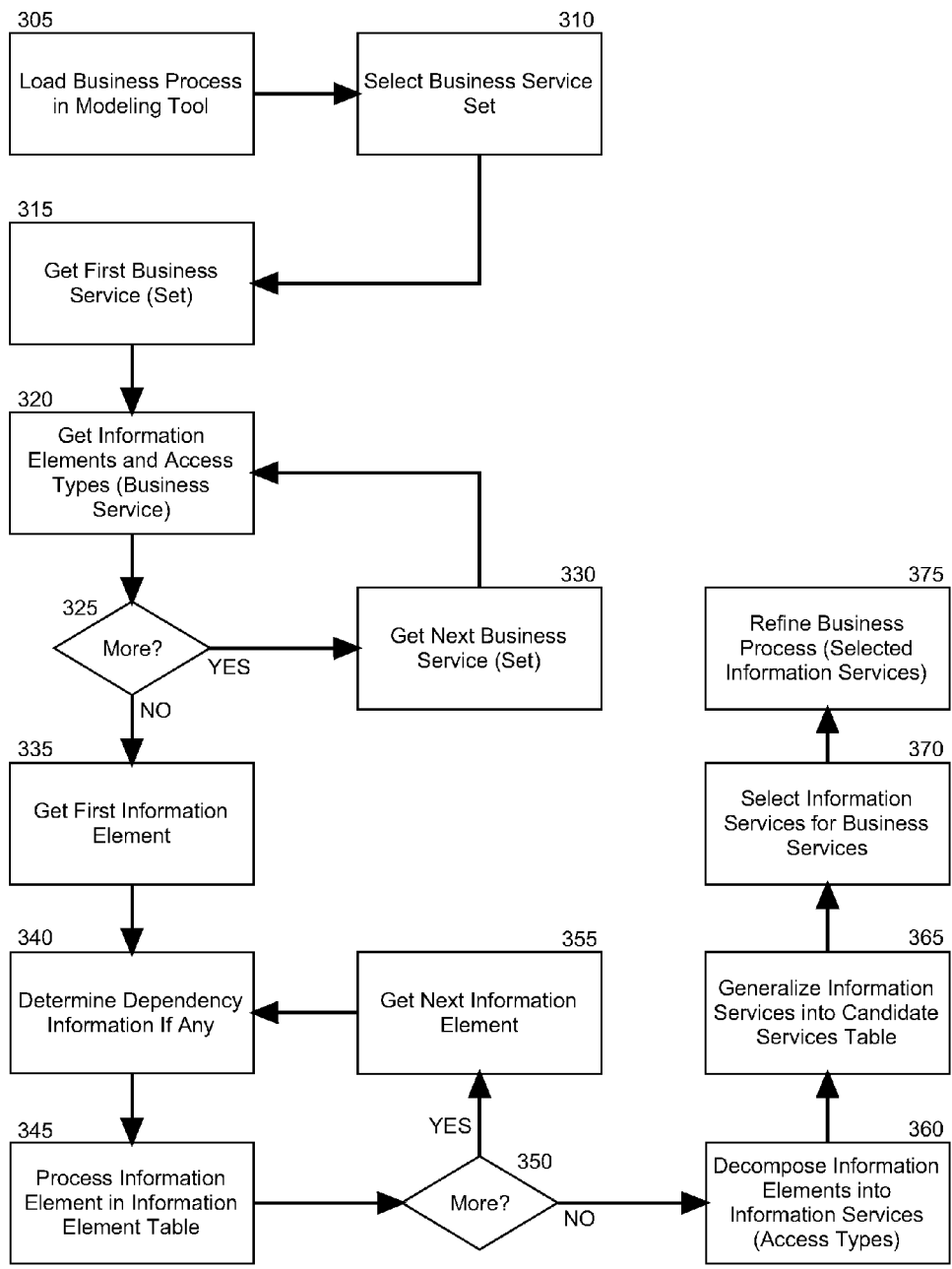

In more particular illustration of the operation of the information service selection module 250, FIG. 3 is a flow chart illustrating a process for information service identification during service modeling of an SOA architected computing system. Beginning in block 305, a business process can be loaded in a services modeling tool. In block 310, a set of business services for the business process can be selected and in block 315, a first business service in the set can be selected. Subsequently, in block 320 those information elements directed for access in the business service can be identified along with an access type, such as create, read, update and delete. In decision block 325, if more business services in the set remain to be processed, in block 330 a next business service in the set can be selected and the process can repeat in block 320. In decision block 325, when no further business services remain to be processed, the process can continue through block 335.

In block 335, a first identified information element directed for access by one or more of the business services can be retrieved and in block 340, it can be determined whether or not access to the information element directed by one of the business services is dependent upon access to the information element directed by another of the business services. If not, in block 345 those of the business services determined to direct access to the information element can be recorded in an element table as can one or more access types directed by the business services. Otherwise, in block 345, the dependency can be additionally recorded in connection with the information element in the information element table. In decision block 350, if additional identified information elements remain to be considered, in block 355 a next identified information element can be retrieved and the process can repeat through block 340. When no further identified information elements remain to be processed, the process can continue through block 360.

In block 360, the identified information elements that do not involve dependencies amongst different business services can be decomposed into information transactions according to the different access types recorded in the element table. Subsequently, in block 365 the information transactions can be generalized into a candidate table of information services and in block 370 different ones of the information services in the candidate table can be selected for inclusion in the business process, for instance according to selection criteria like performance improvement criteria, data transfer reduction criteria, or reusability criteria. Finally, in block 375 the business services can be refined in the business process to invoke the selected business services.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:
1. A method for information service identification during service modeling of a service oriented architecture (SOA) architected computing system, the method comprising:
loading a business process that consumes a set of different business services in memory of a service modeling tool executing in a host computing platform;
identifying different information elements directed for access by the business services;

determining a set of information transactions for the identified different information elements;

identifying dependencies resulting from one of the business services acting upon a corresponding one of the information elements temporally prior to a different one of the business services acting upon the same corresponding one of the information elements;

generalizing one or more different information transactions for business service not dependent upon others of the business services to an information service to form a candidate list of information services;

selecting from amongst the candidate list a selection of information services for incorporation into the business process; and, refining the business services of the business process to invoke the selection of information services to access the identified different information elements.

2. The method of claim 1, wherein identifying different information elements directed for access by the business services, comprises identifying different information elements directed for access by the business services and corresponding access types selected from the group consisting of create, read, update and delete.

3. The method of claim 1, wherein selecting from amongst the candidate list a selection of information services for incorporation into the business process, comprises selecting from amongst the candidate list a selection of information services for incorporation into the business process according to selection criteria.

4. The method of claim 3, wherein the selection criteria comprises performance improvement criteria.

5. The method of claim 3, wherein the selection criteria comprises data transfer reduction criteria.

6. The method of claim 3, wherein the selection criteria comprises reusability criteria.

7. A service modeling data processing system configured for information service identification during service modeling of a service oriented architecture (SOA) architected computing system, the data processing system comprising:

a host computing platform comprising at least one computer with at least one processor and memory;

an SOA modeling tool executing in memory in the host computing platform;

an information service selection module coupled to the SOA modeling tool, the module comprising program code enabled to identify different information elements directed for access by different business services of a business process loaded in the SOA modeling tool, to determine a set of information transactions for the identified different information elements, to identify dependencies resulting from one of the business services acting upon a corresponding one of the information elements temporally prior to a different one of the business services acting upon the same corresponding one of the information elements; to generalize one or more different information transactions for business services not dependent upon others of the business services to an information service to form a candidate list of information services, to select from amongst the candidate list a selection of information services for incorporation into the business process according to selection criteria, and to refine the business services of the business process to invoke the selection of information services to access the identified different information elements.

8. The system of claim 7, wherein the selection criteria comprises performance improvement criteria.

9. The system of claim 7, wherein the selection criteria comprises data transfer reduction criteria.

10. The system of claim 7, wherein the selection criteria comprises reusability criteria.

11. A computer program product for information service identification during service modeling of an service oriented architecture (SOA) architected computing system, the computer program product comprising:

a computer readable storage medium having computer readable program code embodied therewith, the computer readable program code comprising:

computer readable program code for loading a business process that consumes a set of different business services in memory of a service modeling tool executing in a host computing platform;

computer readable program code for identifying different information elements directed for access by the business services;

computer readable program code for determining a set of information transactions for the identified different information elements;

computer readable program code for generalizing the set of information transactions into a candidate list of information services;

computer readable program code for identifying dependencies resulting from one of the business services acting upon a corresponding one of the information elements temporally prior to a different one of the business services acting upon the same corresponding one of the information elements;

computer readable program code for generalizing one or more different information transactions for business services not dependent upon others of the business services to an information service to form a candidate list of information services;

computer readable program code for selecting from amongst the candidate list a selection of information services for incorporation into business process; and, computer readable program code for refining the business services of the business process to invoke the selection of information services to access the indentified different information elements.

12. The computer program product of claim 11, wherein the computer readable program code for identifying different information elements directed for access by the business services, comprises computer readable program code for identifying different information elements directed for access by the business services and corresponding access types selected from the group consisting of create, read, update and delete.

13. The computer program product of claim 11, wherein the computer readable program code for generalizing the set of information transactions into a candidate list of information services, comprises:

computer readable program code for extending at least one information transaction in the set of information transactions that returns primary business information to return additional business information related to the primary business information.

14. The computer program product of claim 11, wherein the computer readable program code for selecting from amongst the candidate list a selection of information services for incorporation into the business process, comprises computer readable program code for selecting from amongst the candidate list a selection of information services for incorporation into the business process according to selection criteria.

15. The computer program product of claim 13, wherein the selection criteria comprises performance improvement criteria.

16. The computer program product of claim 13, wherein the selection criteria comprises data transfer reduction criteria.

17. The computer program product of claim 13, wherein the selection criteria comprises reusability criteria.

\* \* \* \* \*